United States Patent
Tullberg et al.

(10) Patent No.: US 12,488,041 B2
(45) Date of Patent: Dec. 2, 2025

(54) SYSTEMS AND METHODS FOR MANAGING METADATA

(71) Applicant: Axis AB, Lund (SE)

(72) Inventors: Joacim Tullberg, Lund (SE); Timo Sachse, Lund (SE)

(73) Assignee: AXIS AB, Lund (SE)

( * ) Notice: Subject to any disclaimer, the term of this patent is extended or adjusted under 35 U.S.C. 154(b) by 451 days.

(21) Appl. No.: 17/986,900

(22) Filed: Nov. 15, 2022

(65) Prior Publication Data

US 2023/0195781 A1 Jun. 22, 2023

(30) Foreign Application Priority Data

Dec. 21, 2021 (EP) .................................. 21216361

(51) Int. Cl.
*G06F 16/583* (2019.01)
(52) U.S. Cl.
CPC ...... *G06F 16/5854* (2019.01); *G06F 16/5838* (2019.01)
(58) Field of Classification Search
CPC ............. G06F 16/5854; G06F 16/5838; G06F 16/783; G06F 16/583; G06F 16/7837; H04N 21/84; H04N 19/124; H04N 19/463; G06V 10/225; G06V 2201/10; G06T 3/40

See application file for complete search history.

(56) References Cited

U.S. PATENT DOCUMENTS

| | | | | |
|---|---|---|---|---|
| 10,867,217 | B1 * | 12/2020 | Madden | G06V 10/764 |
| 2010/0208064 | A1 | 8/2010 | Liu et al. | |
| 2012/0158721 | A1 * | 6/2012 | Hua | G06F 16/5866 |
| | | | | 707/E17.03 |
| 2013/0166711 | A1 | 6/2013 | Wang et al. | |
| 2015/0358650 | A1 * | 12/2015 | Kulkarni | H04N 21/435 |
| | | | | 386/239 |
| 2016/0019426 | A1 | 1/2016 | Tusch et al. | |
| 2016/0314354 | A1 * | 10/2016 | Teuton | G06V 20/695 |
| 2016/0357762 | A1 | 12/2016 | Aghdasi et al. | |
| 2018/0103199 | A1 * | 4/2018 | Hendry | H04N 21/440227 |
| 2018/0241972 | A1 | 8/2018 | Lee et al. | |
| 2020/0236328 | A1 | 7/2020 | Drako et al. | |
| 2022/0108489 | A1 * | 4/2022 | Sugio | H04N 19/196 |
| 2024/0037985 | A1 * | 2/2024 | Kimhi | G06V 40/172 |

FOREIGN PATENT DOCUMENTS

WO 2020/180903 A1 9/2020

* cited by examiner

*Primary Examiner* — Oneal R Mistry
*Assistant Examiner* — Justin Philip Cascais
(74) *Attorney, Agent, or Firm* — XSENSUS LLP (57) ABSTRACT

A device and method for managing metadata associated with an object detected in an image, where the object corresponds to an area of the image are disclosed. A metadata item associated with the object is obtained, where the metadata item includes an identification of the area, and a quantitative level of an image data characteristic of the area or of the area as encoded is determined. A condition in relation to the determined quantitative level of the image data characteristic is evaluated, and on condition that the condition is fulfilled, reducing or discarding the metadata item. In an alternative, a level of compression of the area as encoded is determined, and it is determined if the level of compression is higher than a compression threshold. On condition that the level of compression is higher than the compression threshold, the metadata item is reduced or discarded.

15 Claims, 4 Drawing Sheets

SYSTEMS AND METHODS FOR MANAGING METADATA

CROSS-REFERENCE TO RELATED APPLICATION

This application claims priority to European Patent Application No. 21216361.2 filed on Dec. 21, 2021, the entire disclosure of which is incorporated by reference herein.

TECHNICAL FIELD

The present invention relates to managing metadata in relation to video, and specifically to reducing or discarding a metadata item in relation to an object detected in an image.

BACKGROUND

Metadata is data that describes other data, and may for example provide information, such as information regarding detected objects, in video data. Metadata may for example be used for making searching large amounts of stored data more efficient. Instead of searching through a video stream by decoding it, analysing the images, etc., some information about the video stream, such as information regarding detected objects, may be more easily and quickly found by searching through the metadata.

A problem that may arise is that metadata generated by a camera, or another type of device, along the video data can be very complex and "heavy", meaning a lot of metadata is created which need to be transported, thus requiring bandwidth, and stored, thus requiring storage capacity. In addition, the processing of larger amounts of metadata may become more time consuming.

Methods and systems have been provided that reduce the amount of metadata in relation to object detection which is transported and/or stored. However, problems remain with metadata transported and/or stored which may not be of use for a subsequent analysis. Hence, further criteria for reducing or discarding metadata are desirable.

SUMMARY OF THE INVENTION

An object of the present invention is to facilitate enhanced management of metadata by reduction or discarding of metadata items in relation detected objects in images.

The present disclosure is based on a recognition that the relevance or usefulness of a metadata item of a detected object that could form a basis for determining whether or not to reduce or discard the metadata item can be derived from image data of the area or the area as encoded corresponding to the detected object or from properties of that image data. The relevance or usefulness of the metadata item relates to a post-analysis, or subsequent analysis, of the image data of the image area depicting the detected object. For example, a forensic analysis of the image area to determine an identity of the object. If the post-analysis cannot be performed as desired, for example if the object is not depicted with a sufficiently high resolution for identifying the object, there is no point in saving the metadata item relating to the detected object with respect to the post-analysis. The present disclosure describes different embodiments based on this recognition.

According to a first aspect, a method for managing metadata associated with an object detected in an image, wherein the object corresponds to an area of the image, is provided. The method comprises obtaining a metadata item associated with the object, wherein the metadata item comprises an identification of the area, and determining a quantitative level of an image data characteristic of the area or of the area as encoded. The method further comprises evaluating a condition in relation to the determined quantitative level of the image data characteristic, and on condition that the condition is fulfilled, reducing or discarding the metadata item.

By an image data characteristic of the area or the area as encoded is meant a characteristic of the image data of the area or the area as encoded. The image data characteristic may be a characteristic of the image data that is handled or set in an image processing pipeline covering one or more processing steps of the image up until it is ready for encoding. However, the image characteristic may also be detectable in an image after encoding and hence, not only the quantitative level of the image data characteristic of the area but additionally or alternatively the quantitative level of the image data characteristic of the area as encoded can be determined and used in the method. The image data characteristic may be one whose quantitative level affects a relevance or usefulness of the metadata item. For example, low or no usefulness or relevance of the metadata item may be due to a property of the area or encoded area as indicated by the determined quantitative level of the image data characteristics. Specifically, the determined quantitative level of the image data characteristic fulfilling the condition may indicate that one or more intended subsequent analyses of the detected object will not, or is unlikely to, produce any useful results. The image data characteristic and the condition on the quantitative level may be selected depending on the one or more intended subsequent analyses, such that when the condition is fulfilled, the subsequent analysis of the detected object will not, or is unlikely to, produce any useful results, and preferably also such that when the condition is not fulfilled, the subsequent analysis of the detected object may, or will likely, produce useful results.

By evaluating a condition in relation to the determined quantitative level is meant that the determined quantitative level is evaluated in relation to the condition. The condition may be a quantitative condition, such as a threshold above or under which the determined quantitative level should be to fulfil the condition.

By determining a quantitative level of an image data characteristic of the area or of the area as encoded, the thus determined quantitative level of the image data characteristic can be used to determine whether or not the metadata item is relevant or useful in a subsequent analysis. Specifically, the determining is made by evaluation in relation to a condition for reducing or discarding the metadata item. Such determining of whether to reduce or discard a metadata item based directly on the image data of the area of the detected object is fast and will enable identification of metadata items that can be reduced or discarded that would otherwise not have been identified.

Discarding of the metadata item means that the complete metadata item is deleted. Reducing of the metadata may include discarding a subset of all metadata of the metadata item.

The method according to the first aspect may further comprise maintaining the metadata item on condition that the condition is not fulfilled. Maintaining here may simply mean that no reducing or discarding of the metadata item is performed.

The act of determining the quantitative level of the image characteristic of the area or of the area as encoded may comprise determining a level of resolution of the area or of the area as encoded, and the act of evaluating the condition in relation to the quantitative level of the image characteristic may comprise determining if the level of resolution is lower than a resolution threshold. The resolution threshold may be set such that when the determined level of resolution is lower than the resolution threshold, the metadata item will be of no or little use or relevance. This may for example be because one or more intended subsequent analyses of the detected object will not, or is unlikely to, produce a useful result when the level of resolution is lower than the resolution threshold. The intended subsequent analysis may for example be to identify or recognize a person. A positive identification of a person may require a minimum resolution in the image area that is used for the identification in order to be regarded as legit. For example, a requirement may be that the object is depicted with at least 5 pixels per cm, i.e. along a length of the object in the image corresponding to 1 cm of the objects natural size there should be at least 5 pixels.

The act of determining the quantitative level of the image characteristic of the area or of the area as encoded may further comprise determining a level of detail of the object area or of the area as encoded, and the act of evaluating the condition in relation to the quantitative level of the image characteristic may further comprise determining if the level of detail is lower than a detail threshold. The detail threshold may be set such that when the determined level of detail is lower than the detail threshold, the metadata item will be of no or little use or relevance. This may for example be because one or more intended subsequent analyses of the detected object will not, or is unlikely to, produce a useful result when the level of detail is lower than the detail threshold.

The act of determining the quantitative level of the image characteristic of the area or of the area as encoded may further comprise determining, a level of colour of with the object area or of the area as encoded, and the act of evaluating the condition in relation to the quantitative level of the image characteristic may further comprise determining if the level of colour is lower than a colour threshold. The colour threshold may be set such that when the determined level of detail is lower than the colour threshold, the metadata item will be of no or little use or relevance. This may for example be because one or more intended subsequent analyses of the detected object will not, or is unlikely to, produce a useful result when the level of colour is lower than the colour threshold.

The act of determining the quantitative level of the image characteristic of the area or of the area as encoded may further comprise determining a level of contrast of the area or of the area as encoded, and the act of evaluating the condition in relation to the quantitative level of the image characteristic may further comprise determining if the level of contrast is lower than a contrast threshold. The detail threshold may be set such that when the determined level of detail is lower than the detail threshold, the metadata item will be of no or little use or relevance. This may for example be because one or more intended subsequent analyses of the detected object will not, or is unlikely to, produce a useful result when the level of contrast is lower than the contrast threshold.

According to a second aspect a method for managing metadata associated with an object detected in an image, wherein the object corresponds to an area of the image, is provided. The method comprises obtaining a metadata item associated with the object, wherein the metadata item comprises an identification of the area, and determining a level of compression of the area as encoded. The method further comprises determining if the level of compression is higher than a compression threshold, and, on condition that the level of compression is higher than the compression threshold, reducing or discarding the metadata item.

Unlike the method according to the first aspect, the method according to the second aspect determines a level of compression of the area as encoded instead of a quantitative level of an image data characteristic of the area or the area as encoded. The compression is not a direct characteristic of the image data but rather a characteristic of a processing of the image data. Specifically, the level of compression indicates to what extent the image data of the area has been compressed when encoding the image data of the area. Furthermore, unlike image data characteristics being set or handled in an image processing pipeline, the level of compression is determined in an encoding portion, e.g. in an encoder.

The determined level of compression could indicate that one or more intended subsequent analyses of the detected object will not, or is unlikely to, produce any useful results. The compression threshold may be selected depending on the one or more intended subsequent analyses, such that the condition is fulfilled when the type of, or specific, intended subsequent analysis of the detected object will not, or is unlikely to, produce any useful results, and preferably also not fulfilled when the type of, or specific, intended subsequent analysis of the detected object may, or will likely, produce useful results.

The compression threshold may be set such that when the determined level of compression is lower than the compression threshold, the metadata item will be of no or little use or relevance. This may for example be because one or more intended subsequent analyses of the detected object will not, or is unlikely to, produce a useful result when the determined level of compression is higher than the compression threshold.

By determining a level of compression of the area as encoded, the thus determined level of compression can be used to determine whether or not the metadata item is relevant or useful. Specifically, the determining is made by evaluation in relation to a condition in the form of a compression threshold below which the metadata item should be reduced or discarded. Such determining of whether to reduce or discard a metadata item based on the compression level, i.e. indirectly on the image data, of the area as encoded is fast and will enable identification of metadata items that can be reduced or discarded that would otherwise not have been identified.

The method according to the second aspect may further comprise maintaining the metadata item on condition that the level of compression is equal to or lower than the compression threshold. Maintaining here may simply mean that no reducing or discarding of the metadata item is performed.

The compression threshold may be set such that when the determined level of compression is lower than the compression threshold, one or more intended subsequent analyses of the detected object will not, or is unlikely to, produce a useful result.

The act of determining the level of compression may comprise obtaining one or more compression values of the area as encoded, and determining the level of compression of the area as encoded based on the one or more obtained compression values. On condition that one compression value is obtained, the level of compression may be determined as the one compression value. On condition that more than one compression value is obtained, the level of compression may be determined as one of: the lowest of the obtained more than one levels of compression, an average of the obtained more than one levels of compression, a median of the obtained more than one levels of compression, and the highest of the obtained more than one levels of compression.

According to a third aspect, a method of managing metadata relating to areas in an image. The method comprises performing the method according to the first aspect or the method according to the second aspect for each of a set of metadata items relating to respective objects, which objects correspond to respective areas in the image.

According to a fourth aspect, a non-transitory computer-readable storage medium is provided having stored thereon instructions for implementing the method according to the first aspect or the method according to the second aspect, when executed by a device having processing capabilities.

The above-mentioned features of the method according to the first aspect and the method according to the second aspect, when applicable, apply to this third aspect as well. In order to avoid undue repetition, reference is made to the above.

According to a fifth aspect, a system device for managing metadata associated with an object detected in an image, wherein the object corresponds to an area of the image, is provided. The system comprises circuitry configured to execute a metadata obtaining function configured to obtain a metadata item associated with the object, wherein the metadata item comprises an identification of the area, and a level determining function configured to determine a quantitative level of an image data characteristic of the area or of the area as encoded. The circuitry is further configured to execute an evaluation function configured to evaluate a condition in relation to the determined quantitative level of the image data characteristic, and a metadata item managing function configured to reduce or discarding the metadata item on condition that the condition is fulfilled.

The metadata item managing function may further configured to maintain the metadata item on condition that the condition is not fulfilled.

The above-mentioned features of the method according to the first aspect, when applicable, apply to this fifth aspect as well. In order to avoid undue repetition, reference is made to the above.

According to a sixth aspect, a system for managing metadata associated with an object detected in an image, wherein the object corresponds to an area of the image is provided. The system device comprises circuitry configured to execute a metadata obtaining function configured to obtain a metadata item associated with the object, wherein the metadata item comprises an identification of the area and a level determining function configured to determine a level of compression of the area as encoded. The system further comprises an evaluation function configured to determine if the level of compression is higher than a compression threshold, and a metadata item managing function configured to reduce or discarding the metadata item on condition that the level of compression is higher than the compression threshold.

The metadata item managing function may further configured to maintain the metadata item on condition that the condition is not fulfilled.

The above-mentioned features of the method according to the second aspect, when applicable, apply to this sixth aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

The present invention will now be described hereinafter with reference to the accompanying drawings, in which currently preferred embodiments of the invention are illustrated. This invention may, however, be embodied in many different forms and should not be construed as limited to the embodiments set forth herein.

The invention is applicable in scenarios in which an object has been detected corresponding to an area of the image and metadata have been associated to the object. Such a scenario for example arises when tracking an object in a sequence of images of a video. Objects can for example be detected based on motion and tracked based on motion. Such detection and tracking may for example be performed by an object detector and an object tracker, respectively, in a camera. It is then beneficial to be able to reduce or discard metadata items that will not be useful or relevant, e.g. depending on one or more intended subsequent analyses that should be performed subsequent to capturing, encoding and storing each image of the sequence of images of the video. The subsequent analyses may be of forensic character. Not reducing or discarding such metadata items, i.e. metadata items that do not assist the subsequent analyses, will result in unnecessary transporting and/or storing metadata items that will not be useful or relevant.

In the following, embodiments of a first method 100 for managing metadata associated with an object detected in an image will be discussed with reference to FIG. 1. The object corresponds to an area of the image. The area is typically a sub-area of the total area of the image. The area may be defined by the boundaries of the detected object or it may be defined by a bounding box enclosing the detected object. The area is received as an input to the method 100. The method comprises obtaining S110 a metadata item associated with the object. The metadata item associated to the object is a set of metadata relating to the object. The metadata item comprises at least an identification of the area and metadata relating to one or more further types of metadata, such as an indication of object class, object attributes, time, speed (e.g. from radar), direction of movement (from a series of frames), etc. Metadata types indicating more general information may also be included in the metadata item, such as camera firmware, image frame information such as resolution, aperture size, etc. The metadata is typically generated in the camera in which the image is captured but could also include data from other sources. The area is typically identified by means of the coordinates of the area in the image. Metadata may for example be packaged in JSON, XML or similar descriptive text format.

A quantitative level of an image data characteristic of the area or of the area as encoded is then determined S120. By the image data characteristics of the area and of the area as encoded is meant the characteristics of the image data of the area and of the area as encoded, respectively. The method further comprises evaluating S130 a condition in relation to the determined quantitative level of the image data characteristic, and on condition that the condition is fulfilled, reducing or discarding S140 the metadata item.

The image data characteristic may be a characteristic that is determined in a so-called image processing pipeline (IPP) or image pipeline of the camera. Acquiring and processing of digital images are performed by the image pipeline which is an integral part of any camera system. For many camera systems today, the image pipeline is controlled by automated processes which adjust settings used in handling of image data in the image pipeline. The image pipeline may be seen as including different components, or blocks, that each handles a specific part in the pipeline. Non-limiting examples of such components, or blocks, are a sensor component for image data acquiring, a gain component for applying gain, exposure time component for controlling exposure (shutter) time, a filter component for applying filter, and a white balance component for adjusting white balance (WB).

The image characteristic will typically also be detectable in an image after encoding and hence, not only the quantitative level of the image data characteristic of the area but additionally or alternatively the quantitative level of the image data characteristic of the area as encoded can be determined and used in the method 100.

Furthermore, the quantitative level of the image data characteristic of the area may be a good indication or may be proportional to the quantitative level of the image data characteristic of the area as encoded. Hence, the image data characteristic of the area can be determined and used in the method 100 even if the even if the subsequent analyses will be performed for an encoded image, i.e. for the area as encoded.

Reducing the metadata item may include discarding some of the metadata included the metadata item but not discarding other metadata included in the meta data item, e.g. discarding metadata of one or more metadata types but not discarding metadata of one or more other metadata types. Determining which metadata should be discarded in the metadata item or whether the metadata item as a whole should be discarded once the condition is fulfilled may be based on a priority of the different types of metadata included in the metadata item.

In alternative to having one condition, a first condition and a second condition may be specified, such that the metadata item is reduced if the first condition is fulfilled and the metadata item is discarded if the second condition is fulfilled.

The selection of whether to reduce the metadata item or to discard the metadata item may also depend on other parameters, such as the type of object detected, the type of intended subsequent analysis, available capacity for transporting the image and metadata item, available capacity for storing the image and metadata item, etc.

The image data characteristic may typically be selected as one whose quantitative level affects a relevance or usefulness of the metadata item. For example, the determined quantitative level of the image data characteristic fulfilling the condition could indicate that one or more intended subsequent analyses of the detected object will not, or is unlikely to, produce any useful results. The image data characteristic and the condition on the quantitative level may thus be selected depending on the one or more intended subsequent analyses, such that when the condition is fulfilled, the intended subsequent analysis of the detected object will not, or is unlikely to, produce any useful results, and preferably also such that when the condition is not fulfilled, the subsequent analysis of the detected object may, or will likely, produce useful results. The selection may be performed in relation to a specific intended subsequent analysis by first selecting the image data characteristic and then set a candidate condition on the quantitative level of the image data characteristic and then determine if the specific intended subsequent analysis produces any useful result or not when the condition is fulfilled. The candidate condition may then be iteratively updated to identify a selected condition such that when the selected condition is fulfilled, the intended subsequent analysis of the detected object will not, or is unlikely to, produce any useful results, and preferably also such that when the condition is not fulfilled, the subsequent analysis of the detected object may, or will likely, produce useful results. The iterative selection may also be performed for one or more selected intended subsequent analyses or one or more types of intended subsequent analyses.

The method according to the first aspect may further comprise maintaining S150 the metadata item on condition that the condition is not fulfilled. Maintaining here may simply mean that no reducing or discarding of the metadata item is performed.

The method 100 may be performed in a system comprising more than one device, such that one or more of the acts (steps) are performed in one device and one or more other acts are performed in another device. In alternative all of the acts of the method 100 may be performed in a single device. Such a device may for example be a monitoring camera. Furthermore, the different acts of the method 100 may be performed within a short period of time or may be performed in a more outstretched period of time.

For example, the method 100 may be performed within a short period of time, e.g. in networked camera, such that when the image has been captured by the camera, the method is performed before the image is transmitted via a network to a remote site for storage and analysis. In such a scenario, all acts of the method 100 including the reducing or discarding S140 of the metadata item is preferably performed in the camera before transmitting the image and metadata items relating to detected objects in the image in order to reduce any metadata items before transmission. This is particularly advantageous if the transmission capacity is limited.

In alternative, the method 100 may be performed in a more outstretched period of time. For example, the metadata item associated with the detected object may be obtained and the image and the related metadata item may be stored for a period of time. The determining S120 of the quantitative level of the image data characteristic may then be performed at a later stage when it has been decided which subsequent analysis that should be performed. Specifically, the selection of which image data characteristic is relevant may then be postponed until it has been decided which subsequent analysis that should be performed. Once it has been decided which subsequent analysis that should be performed and the image characteristic and condition has been determined depending on the subsequent analysis that should be performed, the rest of the method 100 can be performed resulting in reducing or discarding the metadata item if the condition is fulfilled. In another example, all acts except the actual reducing or discarding S140 may be performed before storing the image and the related metadata item for a period of time. If condition was fulfilled, the corresponding metadata item may be tagged with an indication that it should be or may be reduced or discarded. Then at a later stage, the metadata item is reduced or discarded from the storage. The timing of, or reason for, later reducing or discarding may for example be that a predetermined period of time has passed since the capturing of the image. Both reducing and discarding may be performed in series, such that the metadata item is first reduced after a first predetermined period of time, e.g. from storing or capturing, and then discarded after a second period of time from reducing. The reducing or discarding may also be performed after the metadata item has fulfilled its purpose, e.g. the compilation of statistics over a time period, that all subsequent analyses have been performed etc., and once used for its purpose, it does not need to be stored anymore.

The image data characteristic may for example be resolution, detail, colour, contrast etc. Determining a quantitative level of the image data characteristic may thus mean determining a quantitative level of resolution, detail, colour, contrast etc. The image data characteristic is a characteristic that is inherent in the image data and the quantitative level of the image data characteristic can be determined directly from the image data.

The act of determining S110 the quantitative level of the image characteristic of the area or of the area as encoded may comprise determining a level of resolution (detail) of the area or of the area as encoded and the act of evaluating S130 the condition in relation to the quantitative level of the image characteristic may comprise determining if the level of resolution (detail) is lower than a resolution threshold.

The resolution threshold may be set such that when the determined level of resolution is lower than the resolution threshold, the metadata item will be of no or little use or relevance. This may for example be because one or more intended subsequent analyses of the detected object will not, or is unlikely to, produce a useful result when the level of resolution is lower than the resolution threshold.

As an example, an intended subsequent analysis may depend on recognizing particular features in the image for the detected object. Recognizing particular features in the image for the detected object may for example relate to recognizing details of a particular size. A level of resolution can then be identified below which such recognition will not be, or is unlikely to be, possible and hence, the intended subsequent analysis will not, or is unlikely to, produce any useful results. On the other hand, above the identified level of resolution such recognition may be possible and hence, the intended subsequent analysis may produce any useful results. Such a level of resolution may be identified based on an iterative testing and using empirical results from each test and the resolution threshold may then be set to the thus identified level of resolution.

Going more into detail, a useful result may be determined as a legit result according to a predetermined standard. For example, a legit recognition of a face may need to be based on an image area and depicting the face with at least 2 pixels per cm of the depicted face. In another example, a minimum number of horizontal pixels in the image area is required. For example, in order to identify a person by its face in various outdoor conditions, a minimum level of resolution (detail) of 80 horizontal pixels are required in the image area depicting the face. If the resolution of the image area does not fulfil the set minimum requirements for a given analysis of a certain object detection, the metadata item concerning that object detection is not useful for that analysis and the metadata item can be reduced or discarded. Hence, if the determined level of resolution (detail) is determined to be lower than 80 horizontal pixels for a detected object in the form of a face, a metadata item in relation to the detected object can be reduced or discarded if the subsequent analysis relates to identification of a person.

If the level of resolution (detail) is to low, e.g. due to the distance to the detected object from the camera capturing the image, resulting in less pixels on the detected object, more detailed analysis like mask detection, hard hat detection, accessory (backpack, bag, weapon etc.) will not be possible. The level of resolution (detail) can for example be approximated by means of an approximation of the natural size of the detected object. If for example a person is detected, an approximation of the person height to 1.8 m and width between 0.5 m (front) and 0.3 m (side) can be used to determine an approximate number of pixels per cm length and per cm width in the image based on a known number of pixels per cm hight and width of the image. In alternative for objects whose natural size is not known, the pixel density can be approximated for a given focal length and resolution at a certain distance using algorithms that take these variables into account and based on knowledge about the distances between certain points in the scene and the camera.

The lower the resolution, or in other words the pixels on target/object, the less certain a subsequent analysis, e.g. using artificial intelligence (AI), will be about e.g. classification of the object. It either produces a low likelihood value for this object belonging to a certain class and/or it also flags it potentially to belong to other classes as well, making the result of the classification attempt inconclusive.

The act of determining the quantitative level of the image characteristic of the area or of the area as encoded may further comprise determining a level of colour of the area or of the area as encoded, and the act of evaluating the condition in relation to the quantitative level of the image characteristic may further comprise determining if the level of colour is lower than a colour threshold.

The colour threshold may be set such that when the determined level of detail is lower than the colour threshold, the metadata item will be of no or little use or relevance. This may for example be because one or more intended subsequent analyses of the detected object will not, or is unlikely to, produce a useful result when the level of colour is lower than the colour threshold.

As an example, an intended subsequent analysis may depend on recognizing particular features in the image for the detected object. Recognizing particular features in the image for the detected object may for example relate to recognizing colours. A level of colour can then be identified below which such recognition will not be, or is unlikely to be, possible and hence, the intended subsequent analysis will not, or is unlikely to, produce any useful results. On the other hand, above the identified level of colour such recognition may be possible and hence, the intended subsequent analysis may produce any useful results. Such a level of colour may be identified based on an iterative testing and using empirical results from each test and the colour threshold may then be set to the thus identified level of colour.

For example, specific colour searches, e.g. classify people wearing a yellow jacket or the inverse search for all human objects not wearing such colour, e.g. on a construction site with high-vis clothing requirement, could be made impossible in the absence of colour or if the level of colour is low.

A specific way of identifying absence of colour in an image is by means of the mode of an infrared (IR) filter or not in a camera, e.g. relating to night and day mode. If an indicator "ir_cut filter on/off" is off, the camera is in IR mode and the camera is then switched to black and white and no colour will be detected.

The act of determining the quantitative level of the image characteristic of the area or of the area as encoded may further comprise determining a level of contrast of the area or of the area as encoded, and the act of evaluating the condition in relation to the quantitative level of the image characteristic may further comprise determining if the level of contrast is lower than a contrast threshold.

The contrast threshold may be set such that when the determined level of contrast is lower than the contrast threshold, the metadata item will be of no or little use or relevance. This may for example be because one or more intended subsequent analyses of the detected object will not, or is unlikely to, produce a useful result when the level of contrast is lower than the contrast threshold.

As an example, an intended subsequent analysis may depend on recognizing particular features in the image for the detected object. Recognizing particular features in the image for the detected object may for example relate to recognizing details of a particular size. A level of contrast can then be identified below which such recognition will not be, or is unlikely to be, possible and hence, the intended subsequent analysis will not, or is unlikely to, produce any useful results. On the other hand, above the identified level of contrast such recognition may be possible and hence, the intended subsequent analysis may produce any useful results. Such a level of contrast may be identified based on an iterative testing and using empirical results from each test and the contrast threshold may then be set to the thus identified level of contrast.

The level of contrast may be determined based on known algorithms. As an example, the contrast may be calculated based on relative luminescence between pixels in the area or the area as encoded.

The lower the contrast, the less certain a subsequent analysis, e.g. using artificial intelligence (AI), will be about e.g. classification of the object. It either produces a low likelihood value for this object belonging to a certain class and/or it also flags it potentially to belong to other classes as well, making the result of the classification attempt inconclusive. If there is no/low contrast, it will be difficult or impossible in a subsequent analysis to find anchor points to conclude anything on.

In the following, embodiments of a second method 200 for managing metadata associated with an object detected in an image will be discussed with reference to FIG. 2. The object corresponds to an area of the image. The area is typically a sub-area of the total area of the image. The area may be defined by the boundaries of the detected object or it may be defined by a bounding box enclosing the detected object. The area is received as an input to the method 100. The method comprises obtaining S210 a metadata item associated with the object. The metadata item associated to the object is a set of metadata relating to the object. The metadata item comprises at least an identification of the area and metadata relating to one or more further types of metadata, such as an indication of object class, object attributes, time, speed (e.g. from radar), direction of movement (from a series of frames), etc. Metadata types indicating more general information may also be included in the metadata item, such as camera firmware, image frame information such as resolution, aperture size, etc. The metadata is typically generated in the camera in which the image is captured but could also include data from other sources. The area is typically identified by means of the coordinates of the area in the image. Metadata may for example be packaged in JSON, XML or similar descriptive text format.

A level of compression of the area as encoded is determined S220. By the level of compression of the area as encoded is meant the level of compression of the encoded image data of the area as encoded in relation to the image data of the area before encoding. The method further comprises determining S230 if the level of compression is higher than a compression threshold, and, on condition that the level of compression is higher than the compression threshold, reducing or discarding S240 the metadata item.

In alternative to using the compression level itself, any result of the encoding analytics that leads up to the decision of compression value could be used for determining whether or not a metadata item should be reduced or discarded. If the analytics of the encoding concludes that a high compression value is to be used in encoding for the area of the image corresponding to the object, the metadata item should be reduced or discarded already based on such conclusion, since the level of details is very likely to be reduced so that the transferred and stored image does not contain any relevant information anyhow. In addition to this, the compression settings could contain areas which have been defined as always be less relevant and hence higher compressed. For example, a user could have defined the sky (or upper portion of the image) to be less relevant or some scene-analytics (semantic segmentation), could have concluded areas being less relevant. All metadata items relating to objects detected in such high compression areas may be reduced or discarded.

Reducing the metadata item may include discarding some of the metadata included the metadata item but not discarding other metadata included in the metadata item, e.g. discarding metadata of one or more metadata types but not discarding metadata of one or more other metadata types. Determining which metadata should be discarded in the metadata item or whether the metadata item as a whole should be discarded once the condition is fulfilled may be based on a priority of the different types of metadata included in the metadata item.

In alternative to having one condition, a first condition and a second condition may be specified, such that the metadata item is reduced if the first condition is fulfilled and the metadata item is discarded if the second condition is fulfilled.

The selection of whether to reduce the metadata item or to discard the metadata item may also depend on other parameters, such as the type of object detected, the type of intended subsequent analysis, available capacity for transporting the image and metadata item, available capacity for storing the image and metadata item, etc.

Figure 1:
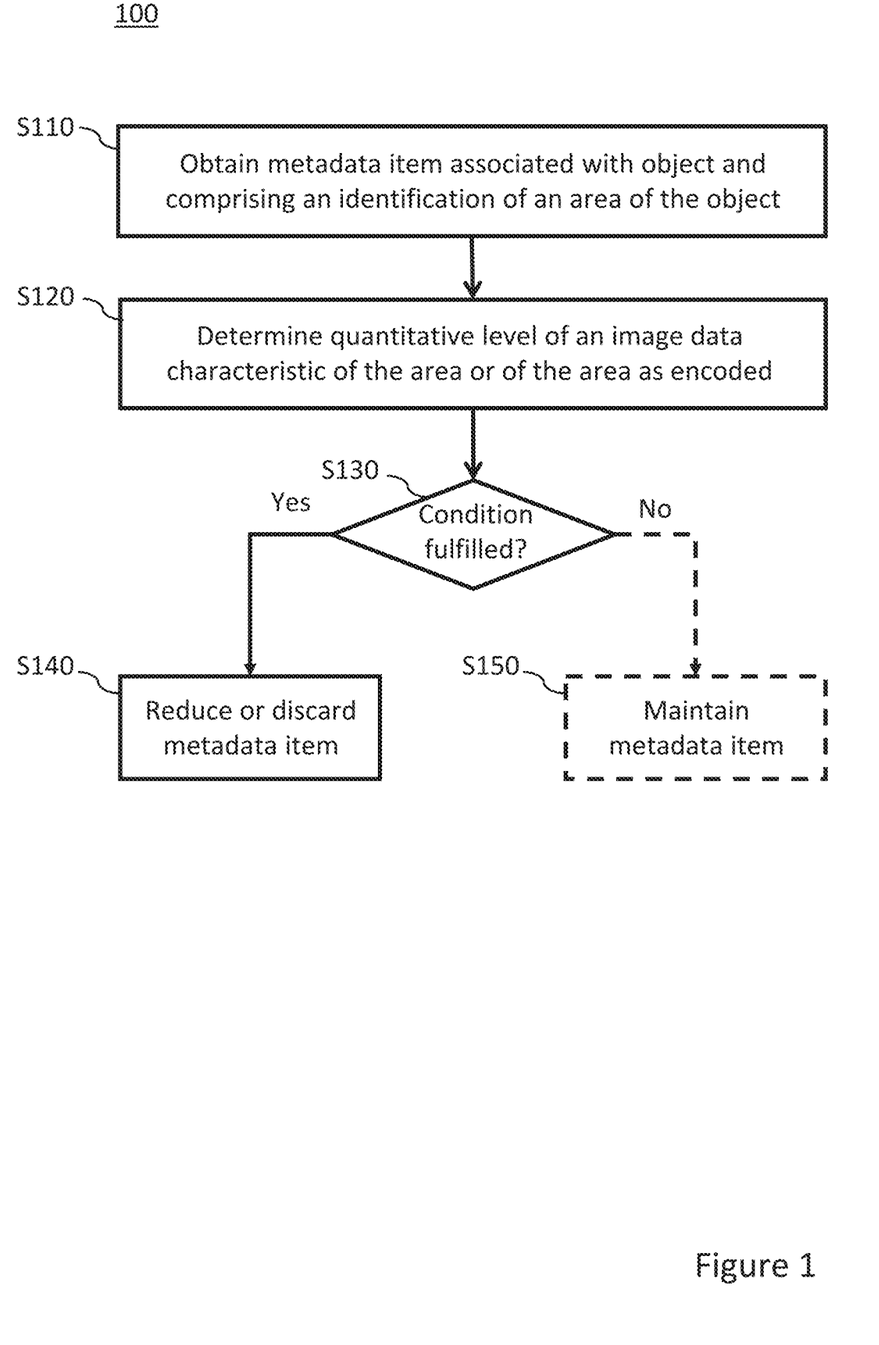
FIG. 1 shows a flow chart in relation to embodiments of a first method of the present disclosure for managing metadata associated with an object detected in an image.

Unlike the method 100 described in relation to FIG. 1, the method 200 determines a level of compression of the area as encoded instead of a quantitative level of an image data characteristic of the area or the area as encoded. The level of compression is not a direct characteristic of the image data but rather a characteristic of a processing of the image data. Specifically, the level of compression indicates to what extent the image data of the area has been compressed when encoding the image data of the area. Furthermore, unlike image data characteristics being set or handled in an image processing pipeline, the level of compression is determined in an encoding portion, e.g. in an encoder. Encoding standards such as H.264 and H.265 can be used as compression scheme by the encoder.

The compression threshold may be set such that when the determined level of compression is higher than the compression threshold, the metadata item will be of no or little use or relevance. This may for example be because one or more intended subsequent analyses of the detected object will not, or is unlikely to, produce a useful result when the level of compression is higher than the compression threshold.

As an example, an intended subsequent analysis may depend on recognizing particular features in the image for the detected object. Recognizing particular features in the image for the detected object may for example relate to recognizing details of a particular size. A level of compression can then be identified below which such recognition will not be, or is unlikely to be, possible and hence, the intended subsequent analysis will not, or is unlikely to, produce any useful results. On the other hand, above the identified level of compression such recognition may be possible and hence, the intended subsequent analysis may produce any useful results. Such a level of compression may be identified based on an iterative testing and using empirical results from each test and the compression threshold may then be set to the thus identified level of compression.

The method 200 may further comprise maintaining S250 the metadata item on condition that the that the level of compression is equal to or lower than the compression threshold. Maintaining here may simply mean that no reducing or discarding of the metadata item is performed.

The act of determining S220 the level of compression may comprise obtaining one or more compression values of the area as encoded, and determining the level of compression of the area as encoded based on the one or more obtained compression values.

For an image, one compression value may be provided for each block of pixels (for example, 16×16 pixels or 64×64 pixels) of the blocks of pixels of the image. In such a case, the one or more blocks of pixels comprised in the area as encoded corresponding to the detected object will be used to determine the level of compression in the area as encoded. On condition that the area as encoded corresponds to one block of pixels, one compression value is obtained, and the level of compression may be determined as the obtained one compression value. On condition that the area as encoded corresponds to more than one block of pixels, more than one compression value is obtained, namely the compression values of the blocks of pixels of the area as encoded. The level of compression may then be determined as one of: the lowest of the obtained more than one compression value, an average of the obtained more than one compression value, a median of the obtained more than one compression value, and the highest of the obtained more than one compression value.

As a further alternative, the metadata item may be reduced or discarded if at least a certain percentage of the area as encoded relates to compression values higher than the compression threshold.

The compression values may for example be obtained in the form of a quantization parameter. The quantization parameters for different portions of the image may be obtained in the form of a quantization parameter map.

The method 200 may be performed in a system comprising more than one device, such that one or more of the acts (steps) are performed in one device and one or more other acts are performed in another device. In alternative all of the acts of the method 200 may be performed in a single device. Such a device may for example be a video camera. Furthermore, the different acts of the method 200 may be performed within a short period of time or may be performed in a more outstretched period of time.

For example, the method 200 may be performed within a short period of time, e.g. in networked camera, such that when the image has been captured by the camera, the method is performed before the image is transmitted via a network to a remote site for storage and analysis. In such a scenario, all acts of the method 200 including the reducing or discarding S240 of the metadata item is preferably performed in the camera before transmitting the image and metadata items relating to detected objects in the image in order to reduce any metadata items before transmission. This is particularly advantageous if the transmission capacity is limited.

In alternative, the method 200 may be performed in a more outstretched period of time. For example, the metadata item associated with the detected object may be obtained and the image and the related metadata item may be stored for a period of time. The determining S220 of the level of compression may then be performed at a later stage when it has been decided which subsequent analysis that should be performed. Specifically, the selection of the compression threshold may then be postponed until it has been decided which subsequent analysis that should be performed. Once it has been decided which subsequent analysis that should be performed and the compression threshold has been determined depending on the subsequent analysis that should be performed, the rest of the method 200 can be performed resulting in reducing or discarding the metadata item if the condition is fulfilled. In another example, all acts except the actual reducing or discarding S240 may be performed before storing the image and the related metadata item for a period of time. If condition was fulfilled, the corresponding metadata item may be tagged with an indication that it should be or may be reduced or discarded. Then at a later stage, the metadata item is reduced or discarded from the storage. The timing of, or reason for, later reducing or discarding may for example be that a predetermined period of time has passed since the capturing of the image. Both reducing and discarding may be performed in series, such that the metadata item is first reduced after a first predetermined period of time, e.g. from storing or capturing, and then discarded after a second period of time from reducing. The reducing or discarding may also be performed after the metadata item has fulfilled its purpose, e.g. the compilation of statistics over a time period, that all subsequent analyses have been performed etc., and once used for its purpose, it does not need to be stored anymore.

The method 100 and the method 200, respectively, may be performed repeatedly for each of a set of metadata items relating to respective objects, which objects correspond to respective areas in the image.

Figure 3:
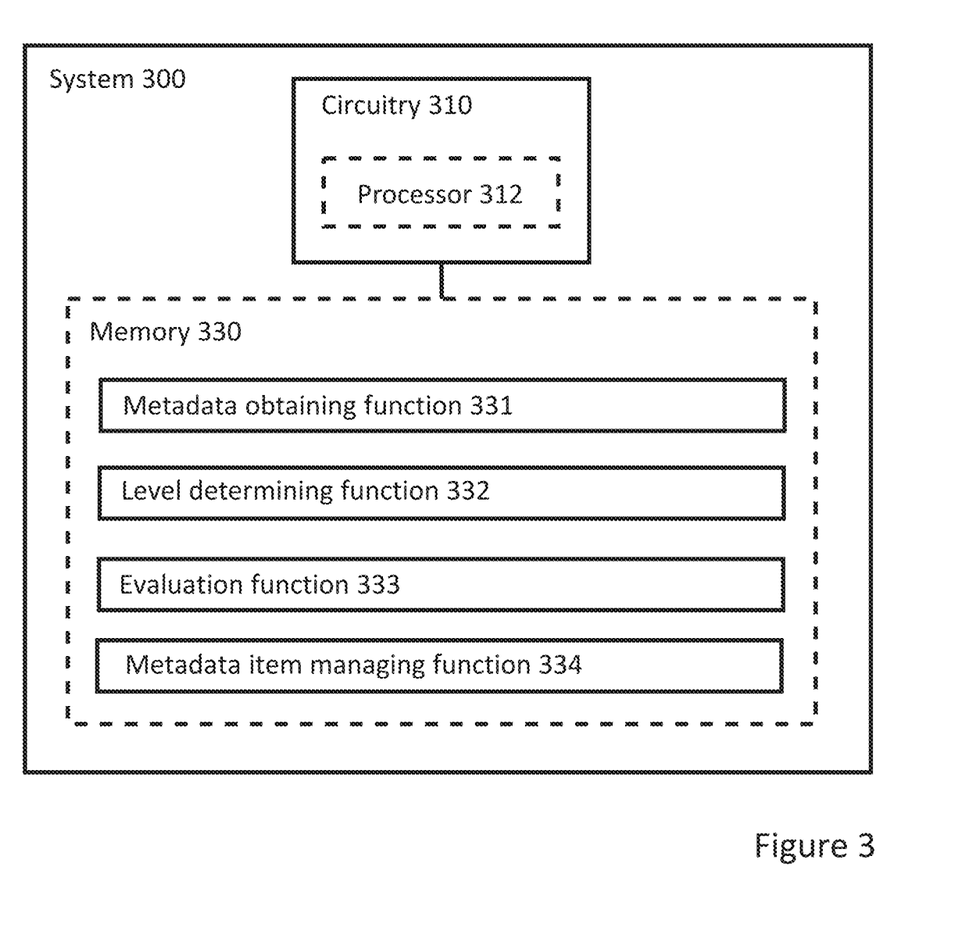
FIG. 3 shows a schematic diagram in relation to embodiments of a first system of the present disclosure for managing metadata associated with an object detected in an image.

FIG. 3 shows a schematic diagram in relation to embodiments of a first system 300 of the present disclosure for managing metadata associated with an object detected in an image, wherein the object corresponds to an area of the image. The system 300 comprises circuitry 310. The circuitry 310 is configured to carry out functions of the system 300. The circuitry 310 may include a processor 312, such as a central processing unit (CPU), microcontroller, or microprocessor. The processor 312 is configured to execute program code. The program code may for example be configured to carry out the functions of the system 300.

The system 300 may further comprise a memory 330. The memory 330 may be one or more of a buffer, a flash memory, a hard drive, a removable media, a volatile memory, a non-volatile memory, a random access memory (RAM), or another suitable device. In a typical arrangement, the memory 330 may include a non-volatile memory for long term data storage and a volatile memory that functions as system memory for the circuitry 310. The memory 330 may exchange data with the circuitry 310 over a data bus. Accompanying control lines and an address bus between the memory 330 and the circuitry 310 also may be present.

Functions of the system 300 may be embodied in the form of executable logic routines (e.g., lines of code, software programs, etc.) that are stored on a non-transitory computer readable medium (e.g., the memory 330) of the system 300 and are executed by the circuitry 310 (e.g., using the processor 312). Furthermore, the functions of the system 300 may be a stand-alone software application or form a part of a software application that carries out additional tasks related to the system 300. The described functions may be considered a method that a processing unit, e.g. the processor 312 of the circuitry 310 is configured to carry out. Also, while the described functions may be implemented in software, such functionality may as well be carried out via dedicated hardware or firmware, or some combination of hardware, firmware and/or software.

The circuitry 310 is configured to execute a metadata obtaining function 331 configured to obtain a metadata item associated with the object, wherein the metadata item comprises an identification of the area, and a level determining function 332 configured to determine a level of compression of the area as encoded.

The circuitry 310 is further configured to execute a level determining function 332 configured to determine a quantitative level of an image data characteristic of the area or of the area as encoded.

The circuitry 310 is further configured to execute an evaluation function 333 configured to evaluate a condition in relation to the determined quantitative level of the image data characteristic.

The circuitry 310 is further configured to execute a metadata item managing function 334 configured to reduce or discarding the metadata item on condition that the condition is fulfilled.

The metadata item managing function 334 may be further configured to maintain the metadata item on condition that the condition is not fulfilled.

The system 300 may be realised in more than one device, such that one or more of the functions are implemented in one device and one or more other functions are implemented in another device. In alternative all of the functions of the system 300 may be implemented in a single device. The single device may for example be a surveillance camera. For further description of this reference is made to the description of the method 100 with reference to FIG. 1.

The functions carried out by the circuitry 310 may be further adapted as the corresponding steps of the embodiments of the method described in relation to FIG. 1.

Figure 4:
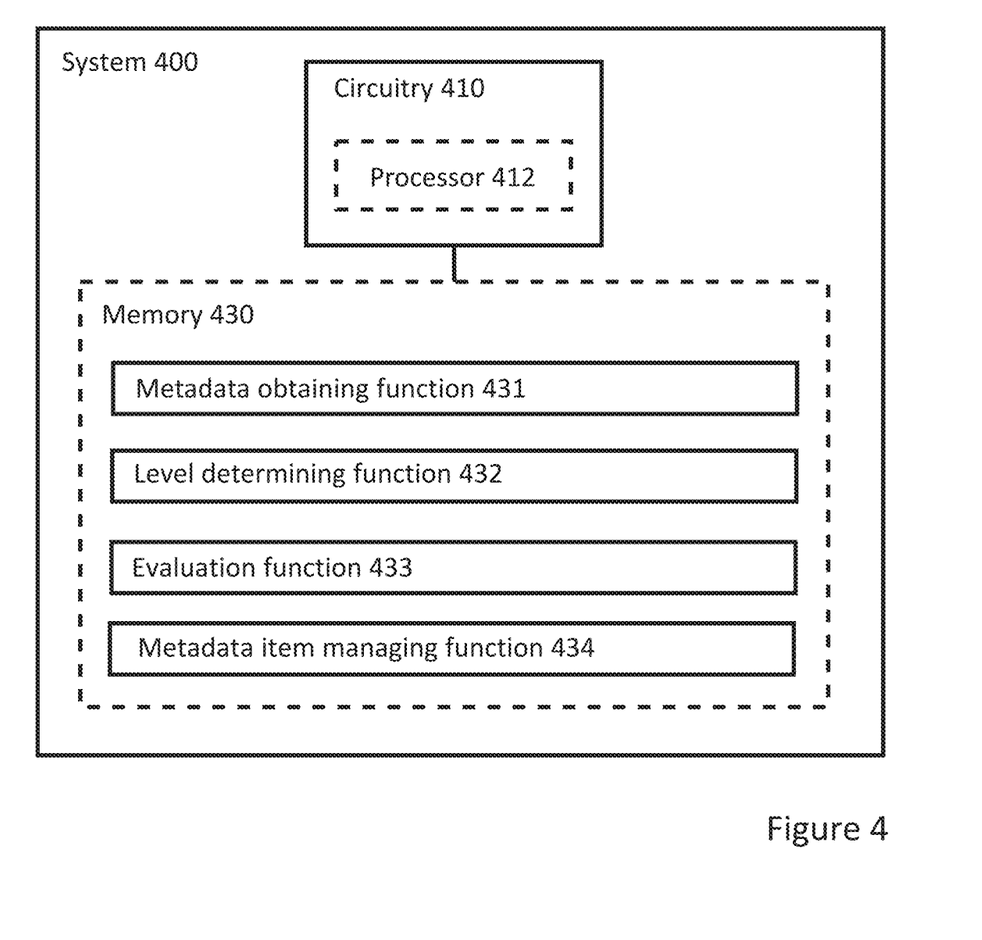
FIG. 4 shows a schematic diagram in relation to embodiments of a system of the present disclosure for managing metadata associated with an object detected in an image.

FIG. 4 shows a schematic diagram in relation to embodiments of a second system 400 of the present disclosure for managing metadata associated with an object detected in an image, wherein the object corresponds to an area of the image. The system 400 comprises circuitry 410. The circuitry 410 is configured to carry out functions of the system 400. The circuitry 410 may include a processor 412, such as a central processing unit (CPU), microcontroller, or microprocessor. The processor 412 is configured to execute program code. The program code may for example be configured to carry out the functions of the system 400.

The system 400 may further comprise a memory 430. The memory 430 may be one or more of a buffer, a flash memory, a hard drive, a removable media, a volatile memory, a non-volatile memory, a random access memory (RAM), or another suitable device. In a typical arrangement, the memory 430 may include a non-volatile memory for long term data storage and a volatile memory that functions as system memory for the circuitry 410. The memory 430 may exchange data with the circuitry 410 over a data bus. Accompanying control lines and an address bus between the memory 430 and the circuitry 410 also may be present.

Functions of the system 400 may be embodied in the form of executable logic routines (e.g., lines of code, software programs, etc.) that are stored on a non-transitory computer readable medium (e.g., the memory 430) of the system 400 and are executed by the circuitry 410 (e.g., using the processor 412). Furthermore, the functions of the system 400 may be a stand-alone software application or form a part of a software application that carries out additional tasks related to the system 400. The described functions may be considered a method that a processing unit, e.g. the processor 412 of the circuitry 410 is configured to carry out. Also, while the described functions may be implemented in software, such functionality may as well be carried out via dedicated hardware or firmware, or some combination of hardware, firmware and/or software.

The circuitry 410 is configured to execute a metadata obtaining function 431 configured to obtain a metadata item associated with the object, wherein the metadata item comprises an identification of the area, The circuitry 410 is further configured to execute a level determining function 432 configured to determine a level of compression of the area as encoded.

The circuitry 410 is further configured to execute an evaluation function 433 configured to determine if the level of compression is higher than a compression threshold.

The circuitry 410 is further configured to execute a metadata item managing function 434 configured to reduce or discarding the metadata item on condition that the level of compression is higher than the compression threshold.

The metadata item managing function 334 may be further configured to maintain the metadata item on condition that the level of compression is lower than or equal to the compression threshold.

The system 400 may be realised in more than one device, such that one or more of the functions are implemented in one device and one or more other functions are implemented in another device. In alternative all of the functions of the system 400 may be implemented in a single device. The single device may for example be a camera. For further description of this reference is made to the description of the method 100 with reference to FIG. 1.

Figure 2:
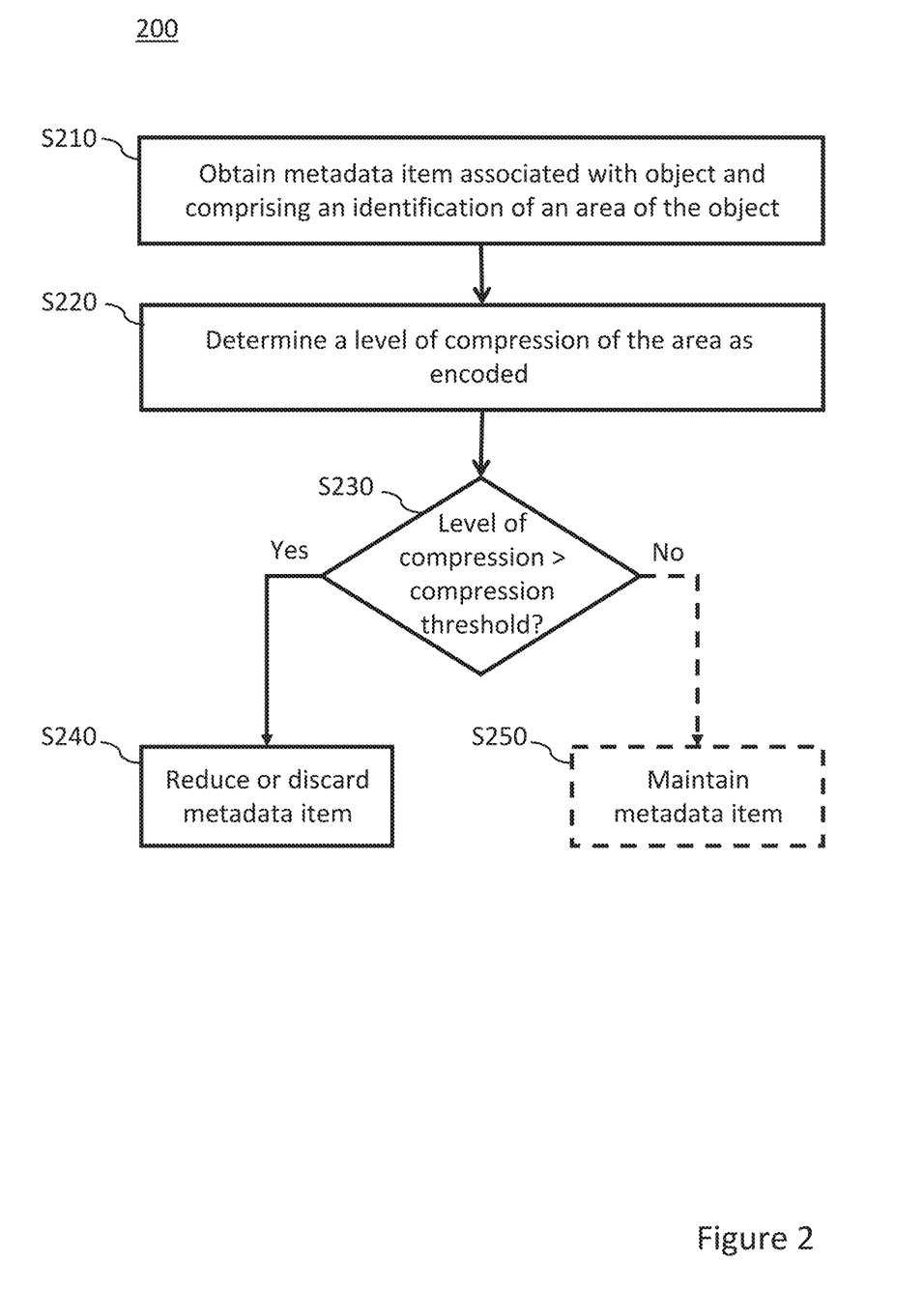
FIG. 2 shows a flow chart in relation to embodiments of a second method of the present disclosure for managing metadata associated with an object detected in an image.

The functions carried out by the circuitry 410 may be further adapted as the corresponding steps of the embodiments of the method described in relation to FIG. 2.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method for managing metadata associated with a plurality of objects detected in a first image of a sequence of images for encoding into a video, wherein each of the plurality of objects corresponds to an object specific sub-area of a total area of the first image, the method performed by a device and comprising:
   for each of the plurality of objects:
      obtaining an object-specific metadata item that includes sub-area identification information;
      determining an object-specific level of resolution;
      comparing the object-specific level of resolution to each of a first resolution threshold and a second resolution threshold lower than the first resolution threshold,
      on a condition that the object-specific level of resolution is lower than the second resolution threshold, discarding the object-specific metadata item;
      on a condition that the object-specific level of resolution is lower than the first resolution threshold but equal to or higher than the second resolution threshold, reducing the object-specific metadata item; and
      on a condition that the object-specific level of resolution is equal to or higher than the first resolution threshold, maintaining the object-specific metadata item;
   encoding all remaining object-specific metadata into the video; and
   transmitting the total area of the first image to another device.

2. A method for managing metadata associated with a plurality of objects detected in a first image of a sequence of images for encoding into a video, wherein each of the plurality of objects corresponds to an object specific sub-area of a total area of the first image, the method performed by a device and comprising:
   for each of the plurality of objects:
      obtaining an object-specific metadata item that includes sub-area identification information;
      determining an object-specific level of contrast;
      comparing the object-specific level of contrast to each of a first contrast threshold and a second contrast threshold lower than the first contrast threshold,
      on a condition that the object-specific level of contrast is lower than the second contrast threshold, discarding the object-specific metadata item;
      on a condition that the object-specific level of contrast is lower than the first contrast threshold but equal to or higher than the second contrast threshold, reducing the object-specific metadata item; and
      on a condition that the object-specific level of contrast is equal to or higher than the first contrast threshold, maintaining the object-specific metadata item;
   encoding all remaining object-specific metadata into the video; and
   transmitting the total area of the first image to another device.

3. A method for managing metadata associated with a plurality of objects detected in a first image of a sequence of images for encoding into a video, wherein each of the plurality of objects corresponds to an object specific sub-area of a total area of the first image, the method performed by a device and comprising:
   for each of the plurality of objects:
      obtaining an object-specific metadata item that includes sub-area identification information;
      determining an object-specific level of compression;
      comparing the object-specific level of compression to each of a first compression threshold and a second compression threshold lower than the first compression threshold,
      on a condition that the object-specific level of compression is lower than the second compression threshold, discarding the object-specific metadata item;
      on a condition that the object-specific level of compression is lower than the first compression threshold but equal to or higher than the second compression threshold, reducing the object-specific metadata item; and
      on a condition that the object-specific level of compression is equal to or higher than the first compression threshold, maintaining the object-specific metadata item;
   encoding all remaining object-specific metadata into the video; and
   transmitting the total area of the first image to another device.

4. A non-transitory computer-readable storage medium having stored thereon instructions for implementing the method according to claim 1, when executed by a device having processing capabilities.

5. The method according to claim 1, further comprising:
   for each of the plurality of objects:
   determining whether a predetermined condition is present; and
   on a condition that the predetermined condition is present, discarding the object- specific metadata item,
   wherein the predetermined condition comprises one of:
      the object corresponds to a predetermined object-type,
      a type of subsequent analysis to be performed on the first image by the another
      an available capacity to transmit the total area of the first image and corresponding metadata to the another device exceeds a transmission threshold, or
      an available capacity to store the total area of the first image and corresponding metadata exceeds a storage threshold.

6. The method according to claim 1, further comprising:
for each of the plurality of objects, after determining that the condition that the object-specific level of resolution is lower than the first resolution threshold but equal to or higher than the second resolution threshold:
determining a priority of the object-specific metadata item; and
discarding the object-specific metadata item when the priority is a second priority level lower than the first priority level.

7. A non-transitory computer-readable storage medium having stored thereon instructions for implementing the method according to claim 2, when executed by a device having processing capabilities.

8. The method according to claim 2, further comprising:
for each of the plurality of objects:
determining whether a predetermined condition is present; and
on a condition that the predetermined condition is present, discarding the object-specific metadata item,
wherein the predetermined condition comprises one of:
the object corresponds to a predetermined object-type,
a type of subsequent analysis to be performed on the first image by the another
an available capacity to transmit the total area of the first image and corresponding metadata to the another device exceeds a transmission threshold, or
an available capacity to store the total area of the first image and corresponding metadata exceeds a storage threshold.

9. The method according to claim 2, further comprising:
for each of the plurality of objects, after determining that the condition that the object-specific level of contrast is lower than the first contrast threshold but equal to or higher than the second contrast threshold:
determining a priority of the object-specific metadata item; and
discarding the object-specific metadata item when the priority is a second priority level lower than the first priority level.

10. A non-transitory computer-readable storage medium having stored thereon instructions for implementing the method according to claim 3, when executed by a device having processing capabilities.

11. The method according to claim 3, further comprising:
for each of the plurality of objects:
determining whether a predetermined condition is present; and
on a condition that the predetermined condition is present, discarding the object-specific metadata item,
wherein the predetermined condition comprises one of:
the object corresponds to a predetermined object-type,
a type of subsequent analysis to be performed on the first image by the another
an available capacity to transmit the total area of the first image and corresponding metadata to the another device exceeds a transmission threshold, or
an available capacity to store the total area of the first image and corresponding metadata exceeds a storage threshold.

12. The method according to claim 3, further comprising:
for each of the plurality of objects, after determining that the condition that the object-specific level of compression is lower than the first compression threshold but equal to or higher than the second compression threshold;
determining a priority of the object-specific metadata item; and
discarding the object-specific metadata item when the priority is a second priority level lower than the first priority level.

13. A device for managing metadata associated with a plurality of objects detected in a first image of a sequence of images for encoding into a video, wherein each of the plurality of objects corresponds to an object specific sub-area of a total area of the first image, the device comprising:
control circuitry configured to execute a process comprising:
for each of the plurality of objects:
obtaining an object-specific metadata item that includes sub-area identification information;
determining an object-specific level of resolution;
comparing the object-specific level of resolution to each of a first resolution threshold and a second resolution threshold lower than the first resolution threshold,
on a condition that the object-specific level of resolution is lower than the second resolution threshold, discarding the object-specific metadata item;
on a condition that the object-specific level of resolution is lower than the first resolution threshold but equal to or higher than the second resolution threshold, reducing the object-specific metadata item; and
on a condition that the object-specific level of resolution is equal to or higher than the first resolution threshold, maintaining the object-specific metadata item;
encoding all remaining object-specific metadata into the video; and
transmitting the total area of the first image to another device.

14. A device for managing metadata associated with a plurality of objects detected in a first image of a sequence of images for encoding into a video, wherein each of the plurality of objects corresponds to an object specific sub-area of a total area of the first image, the device comprising:
control circuitry configured to execute a process comprising:
for each of the plurality of objects:
obtaining an object-specific metadata item that includes sub-area identification information;
determining an object-specific level of contrast;
comparing the object-specific level of contrast to each of a first contrast threshold and a second contrast threshold lower than the first contrast threshold,
on a condition that the object-specific level of contrast is lower than the second contrast threshold, discarding the object-specific metadata item;
on a condition that the object-specific level of contrast is lower than the first contrast threshold but equal to or higher than the second contrast threshold, reducing the object-specific metadata item; and
on a condition that the object-specific level of contrast is equal to or higher than the first contrast threshold, maintaining the object-specific metadata item;
encoding all remaining object-specific metadata into the video; and
transmitting the total area of the first image to another device.

15. A device for managing metadata associated with a plurality of objects detected in a first image of a sequence of images for encoding into a video, wherein each of the plurality of objects corresponds to an object specific sub-area of a total area of the first image, the device comprising;
   control circuitry configured to execute a process comprising:
   for each of the plurality of objects:
      obtaining an object-specific metadata item that includes sub-area identification information:
      determining an object-specific level of compression;
      comparing the object-specific level of compression to each of a first compression threshold and a second compression threshold lower than the first compression threshold,
      on a condition that the object-specific level of compression is lower than the second compression threshold, discarding the object-specific metadata item;
      on a condition that the object-specific level of compression is lower than the first compression threshold but equal to or higher than the second compression threshold, reducing the object-specific metadata item; and
      on a condition that the object-specific level of compression is equal to or higher than the first compression threshold, maintaining the object-specific metadata item;
   encoding all remaining object-specific metadata into the video; and
   transmitting the total area of the first image to another device.

* * * * *